United States Patent [19]

Hanson

[11] 4,250,757

[45] Feb. 17, 1981

[54] MOVABLE ELEMENT WITH POSITION SENSING MEANS FOR TRANSDUCERS

[75] Inventor: Richard A. Hanson, Woodinville, Wash.

[73] Assignee: Sundstrand Data Control, Inc., Redmond, Wash.

[21] Appl. No.: 92,240

[22] Filed: Nov. 5, 1979

Related U.S. Application Data

[63] Continuation-in-part of Ser. No. 905,927, May 15, 1978, abandoned.

[51] Int. Cl.³ ......................................... G01P 15/125
[52] U.S. Cl. ................................................ 73/517 B
[58] Field of Search ............. 73/517 B, 517 R, 432 A, 73/649, 651, 652, 653, 654, 655, 141 R

[56] References Cited

U.S. PATENT DOCUMENTS

| | | | |
|---|---|---|---|
| 2,643,869 | 6/1953 | Clark | 73/517 R X |
| 3,339,419 | 9/1967 | Wilcox | 73/517 B |
| 3,673,873 | 7/1972 | Estes et al. | 73/517 |
| 3,702,073 | 11/1972 | Jacobs | 73/517 B |

*Primary Examiner*—Jerry W. Myracle
*Attorney, Agent, or Firm*—Ted E. Killingsworth; Michael B. McMurry; Harold A. Williamson

[57] ABSTRACT

In an assembly, for use in transducer type instruments such as accelerometers, having a position sensing movable member including a pick-off element, wherein the movable member is secured to a support member by a flexure or hinge and the support member in turn is cantilevered between two stator members, instrument bias errors resulting from the securing of the non-cantilevered portion of the support member between the stator members can be reduced by aligning the edges of the surfaces of the stators that contact the support member with the centroid of the pick-off element so that the axis of cantilever rotation passes through the centroid of the pick-off area. In transducers having electrical leads on the movable member, the flexure and the support member for electrically connecting the pick-off element to the support member, bias errors can be further reduced by including the area of the electrical leads in calculating the centroid.

72 Claims, 7 Drawing Figures

MOVABLE ELEMENT WITH POSITION SENSING MEANS FOR TRANSDUCERS

CROSS-REFERENCE TO RELATED APPLICATION

This application is a continuation-in-part of Ser. No. 905,927, filed on May 15, 1978, now abandoned.

TECHNICAL FIELD

The invention relates to the field of transducers such as accelerometers and the like and more particularly to the structure for supporting a sensing element with position detecting means within the instrument.

BACKGROUND OF THE INVENTION

In prior art structures, an example of which is represented by an accelerometer seismic assembly of the type disclosed in Jacobs, U.S. Pat. No. 3,702,073 assigned to the assignee of this application, the transducing assembly, in this case a seismic assembly, is supported on a flexure connected to a support ring outer member supported between the upper and lower stator assemblies of the accelerometer. The seismic element, in this particular example, includes a force restoring coil and an arcuate pick-off capacitor plate, and is connected by means of one or more flexures to the annular outer support ring. In this instrument the seismic assembly including the support ring and flexures is configured out of a unitary piece of fused quartz.

One of the objectives in designing instrument assemblies and their associated support structures, such as shown in U.S. Pat. No. 3,702,073, is to minimize the effect of stress on the flexure elements connecting the moving element or mass to the outer support structure. Strain in the flexures supporting the seismic mass resulting from stresses in the support structure can result in significant bias errors. In the example of U.S. Pat. No. 3,702,073 which discloses a servoed accelerometer seismic assembly, the pick-off elements are used to produce signals indicating the position of the assembly within instrument which in turn are used to generate a current in a restoring coil attached to the seismic assembly so as to restore the seismic mass to a predetermined position within the instrument. Stress in the flexures in the servoed position can result in an undesired bias in the output signal since the instrument will be attempting to overcome any forces generated in the flexure. In the case of an open-loop instrument the stress in the flexure is free to cause a motion of the pick-off, also producing a bias error in the output. One source of stress forces that can be transmitted to the flexures results from the method for securing support member to the stator elements of the assembly. Since the surface of the stator elements abutting the annular support ring cannot as a practical matter be made perfectly flat, the securing of the support ring, which is also not perfectly flat, to the stator element will in most cases produce stress forces in both the outer support member and the flexures.

One approach to reducing the stress transmitted to flexures in a transducer assembly is disclosed in U.S. Pat. No. 3,702,073. The annular outer support member is clamped between stator elements where spacer elements or pads are interposed between the faces of the stator members and the support ring. In this approach three pairs of pads are spaced approximately 120° around the support member. However, even with this approach undesired stress forces can be generated in the annular support ring which are transmitted to the seismic mass support flexures.

A second approach to reducing the effect of mounting stress is shown in Wilcox U.S. Pat. No. 3,339,419. The Wilcox patent discloses a design wherein the support member is cantilevered, in turn supporting a cantilever mounted movable element with essentially one half of a circular movable element and circular pick-off means on each side of the cantilever support edge. This approach reduces sensitivity to strain rotation by having essentially equal areas of the movable element and a circular pick-off means on each side of the line of mounting of the support member.

It is not, however, usually either practical or even desirable to use a circular pick-off area. It is indeed more efficient to concentrate the pick-off area at a maximum radius from the pivot axis in a pendulous transducer, to maximize pick-off angular gain.

SUMMARY OF THE INVENTION

It is therefore an object of the invention to provide an assembly for use in a transducer having at least one stator member wherein the assembly includes a support member which flexurally supports a movable member that includes a noncircular pick-off area and at least one support element interposed between the stator and the support member such that edges of the support element or elements are in substantial alignment with the centroid of the pick-off area. Where electrical leads are deposited on the support member and the movable member to electrically connect the pick-off area to the support member, the edges of the support are in substantial alignment with the centroid of the combined pick-off and electrical lead area.

It is an additional object of the invention to provide a proof mass assembly for use within an accelerometer having first and second stator members wherein the assembly includes an annular support member secured between said stator members, a movable member including a noncircular pick-off area flexurally suspended from the support member and a number of spacer elements secured between the stators and support member located so as to permit the portion of the support member that is flexurally connected to the movable member to move with respect to the stators and wherein the edges of the spacers over which the support member flexes or rotates are aligned with the centroid of the pick-off area in order to minimize stress in the support member. Where electrical leads are attached to the support member, flexure and movable member of the accelerometer to electrically connect the pick-off area to the support member, the edges of the spacers are aligned with the centroid of the combined pick-off and electrical lead area.

It is another object of the invention to provide a support structure for use within transducers having a stator member, a movable element including pick-off means, supported by means of a flexure connected to a circular support member a portion of which is secured to the stator wherein the support member additionally includes flexure portions that permit the support member to flex in a radial direction located at a maximum distance from the portion secured to the stator in order to minimize stress in the support member resulting from securing the support member to the stator.

In the invention as illustrated, a majority of the support member is cantilevered from the transducer stators in such a manner that the resulting mounting strain at the cantilever axis of rotation occurs about an axis that includes the centroid of the pick-off means. The centroid of a body of homogeneous material is defined as the center of gravity of that body. It has also been found desirable to include the area of electrical leads connecting the pick-off means to terminals on the support structure in computing the centroid. Also, mounting stress sensitivity in the instrument is reduced by maximizing the separation of the flexures connecting the movable member to the support member from the cantilever point where mounting stress is induced. This approach has the additional advantage of not having to use a symmetrical pick-off area configuration or to have the pick-off area centered on the movable element. It should be noted that most pick-offs are sensitive not simply to the angle of rotation of the pick-off area, but to the linear motion of the pick-off centroid as well.

In cases where the pick-off area is essentially circular, as is the case of Wilcox U.S. Pat. No. 3,339,419 rotation about an equal area line will produce a significantly reduced pick-off output sensitivity to such angular motion. However, in the area of precision transducers, complete elimination of all such transducer error sources is a continuing goal. Thus the rotation of the support member about an axis including the pick-off centroid will produce the maximum reduction in angular motion sensitivity in cases where the pick-off area is not circular, nor even necessarily symmetrical. Sensitivity to angular motion can be further reduced in transducers having electrical leads deposited on the support member, flexures and the movable member for connecting the pick-off area to the support member by including the area of the electrical leads in computing the centroid through which the axis of rotation passes. To further reduce sensitivity to angular motion in transducers utilizing capacitive pick-off, any variation in the nominal distance of the pick-off and electrical lead area from the transducer stators should be taken into account in computing the centroid, such that the area is reduced as a function of increasing nominal distance from the stators. This is due to the fact that capacitance decreases directly as a function of distance between the two plates.

If it were possible to place the centroid of the pick-off area exactly on the axis of rotation of the support member, a transducer pick-off with sensitivity only to linear motion, would have zero error induced by angular rotation of the support member about said axis. For example, a theoretical reduction of up to 10 or more to 1 in rotation induced errors is possible in a one inch diameter circular acceleration transducer of the type disclosed in Jacobs U.S. Pat. No. 3,702,073. The improvement would result from locating the axis of rotation of the support member on the centroid of the arcuate pick-off area, as opposed to center of an arcuate pick-off area as described in terms of a circular pick-off in Wilcox U.S. Pat. No. 3,339,419. The actual error reduction would, of course, as a practical matter be dependent on the fabrication tolerances use in manufacturing the instrument.

DETAILED DESCRIPTION OF THE INVENTION

Figures 1, 2:
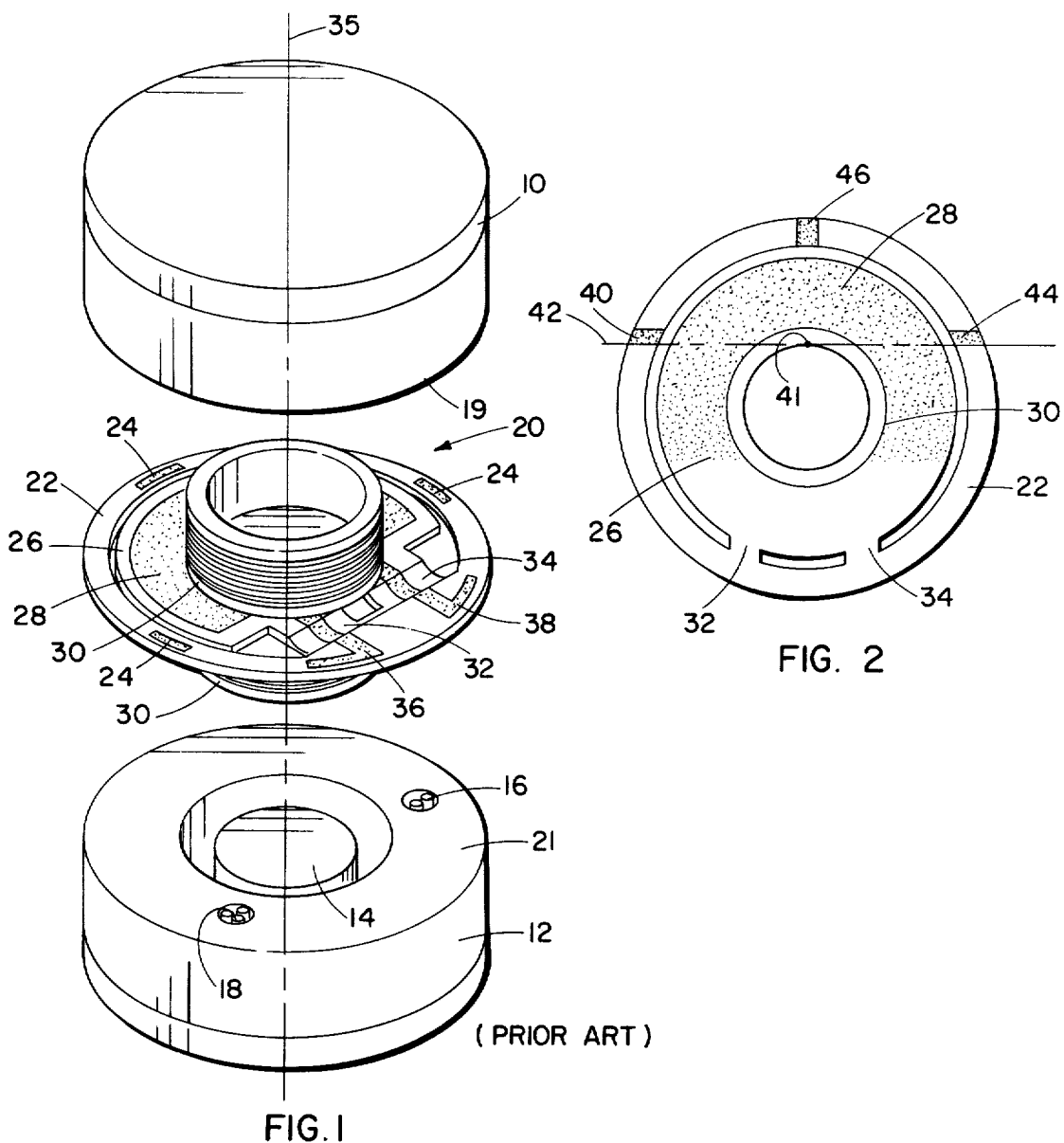
FIG. 1 is an exploded view of an accelerometer including a prior art means of supporting a movable element in conjunction with pick-off means, in the form of a seismic mass.
FIG. 2 is a top view of a proof mass assembly representing an embodiment of the invention for use in an accelerometer.

In FIG. 1 a movable element in conjunction with pick-off means is illustrated in an exploded view in the form of an acceleration transducer of the type disclosed in detail in the aforementioned U.S. Pat. No. 3,702,073. In this embodiment, for descriptive purposes, the accelerometer includes an upper magnet or stator structure 10 and a lower magnet or stator structure 12. Included in each of the upper 10 and lower 12 stator structures are permanent magnets as illustrated by a magnet 14 shown in the lower stator structure 12. In addition the lower stator structure includes support posts for electrical leads as illustrated at 16 and 18. Also shown in FIG. 1 is a movable element assembly in form of a proof mass assembly, generally indicated at 20, of the prior art type. Included in the proof mass assembly is an outer annular support member 22 which is supported between opposed planar surfaces 19 and 21 of the upper stator structure 10 and the lower stator structure 12 by pairs of spacer elements or mounting pads 24 on the member 22. The lower pad of each pair of mounting pads is not shown in the drawings. As shown in FIG. 1 the prior art location of each pair of mounting pads 24 is approximately 120 degrees from each other around the support ring 22. Included in the proof mass assembly 20 is a movable flapper or reed 26 extending radially inwardly from the outer support ring 22. Deposited on each side of the flapper 26 is an electrically conductive material 28 of arcuate shape that serves as a capacitive pick-off area or plate. The capacitive pick-off plates 28 on the upper and lower surfaces of the flapper 26 cooperate with the opposed surfaces 19 and 21 of the upper and lower stator structures 10 and 12 to provide a capacitive pick-off system.

Mounted on each side of the flapper 26 is a force restoring coil 30. As is well understood in the art, the force restoring or torquer coils 30 cooperate with the permanent magnets 14 to retain the flapper 26 within a predetermined position with respect to the support ring 22.

The flapper element 26 including the force coils 30 is connected to the support ring 22 by means of a pair of flexure elements 32 and 34. The flexures 32 and 34 permit the seismic element including the flapper 26 and the coil 30 to move in a rotational pendulous manner with respect to the annular support ring 22. Flapper 26 will move in response to forces along the sensitive axis 35 of the accelerometer. Also deposited on the support ring 22 and flexures 32 and 34 are thin film pick-off leads 36 and 38 which provide electrical connections to the capacitor plates 28 and the force coils 30.

As previously discussed, the securing of support ring 22 to the stator members 10 and 12 can result in excessive stress in the outer support ring 22 and as a result strain can be transmitted to the flexures 32 and 34. The resulting strain in the flexures 32 and 34 can require current to be transmitted through the force coils in a servo accelerometer thus introducing a significant bias error into the signal output of the accelerometer.

Illustrated in FIG. 2 is an embodiment of the invention, shown in the form of a seismic assembly configured in a circular form of the type illustrated in FIG. 1 indicated generally at 20, wherein pairs of pads or spacer elements are arranged on the annular support member 22 so as to reduce the effects of stress in the support ring 22 when the upper stator 10 and the lower stator 12 are clamped together. It is to be noted that the concept of the invention applies equally to noncircular forms of the structures and equally to continuous surface as well as pad mountings. The concept of the invention would also apply to transducers wherein the outer support member 22 is secured to a single stator either by clamping, adhesive or other means. This invention applies also to use of other types of pick-off means, including optical types which might not require a pickoff element as such on the movable element.

In FIG. 2 the reference numerals 22, 26, 28, 30, 32 and 34 correspond to similar elements as described in connection with FIG. 1. In particular a first pair of support elements or pads 40 are located, one on the upper face and one (not shown) on the lower face of the circular support member 22, with each of the pads 40 and 44 and preferably the edges of the pads essentially in alignment with the centroid of the pick-off element 28 as indicated by the line 42. The centroid of the pick-off element is indicated at 41 in FIG. 2. When the pick-off is a planar element of uniform thickness such as a thin deposit of conductive metal to form capacitor plates, the centroid 41 of the pick-off element will be the centroid of the pick-off area. With respect to the centroid of the pick-off area 28 of FIG. 2 the area of the pick-off on one side of the axis 42 times the radius of the centroid of that area is equal to the same quantity on the other side of the axis.

Similarly a second pair of spacer elements or members 44 are located on the other side of the support ring 22 essentially in alignment with the axis 42. A third pair of spacer elements 46 is located on the flexure support ring 22 on a side opposite the flexures 32 and 34. Although it is normally considered desirable to make the spacer elements 40, 44 and 46 as small as possible in order to reduce stress in the flexure support ring 22, there may be circumstances in which it would be desirable to combine spacer elements 40, 44 and 46 into a single member. In any event whether separate spacer elements as illustrated in FIG. 2 are used or a single arcuate spacer member is used extending from the position of spacer 40 to the position of spacer 44, discussed above, it is considered most desirable to have the effective axis of rotation of the cantilevered section of the support ring 22 essentially coincident with a line or axis 42 through the centroid 41 of the pick-off element 28. By locating the spacer elements or pads in this manner, motion of the centroid 41 of the pick-off element 28 parallel to the sensitive axis 35 of the instrument as shown in FIG. 1 due to stress induced in the support ring by clamping the stator members 10 and 12 together will be significantly reduced. This is due to the fact that rotation about the centroid of the pick-off area will produce equal pick-off effects on either side of the axis of rotation thus tending to cancel pick-off errors due to stress in the flexures.

Also, as shown in the embodiment of FIG. 2 it is desirable to have the hinge, as illustrated by flexures 32 and 34, supporting the flapper or movable element 26 located as far as possible from the axis 42 in order to minimize strain in the flexures 32 and 34. The pick-off plate 28 should be located on the movable member 26 as far as possible from the flexures 32 and 34 in order that they can receive the maximum benefit from the angular rotation of the flapper 26. The sensitivity of the pick-off is increased as a function of the distance of the pick-off area from the point of rotation of the flapper 26. Thus by configuring the pick-off area in an arcuate shape as shown in FIG. 2 the maximum pick-off area can be located as far as possible from the flexures 32 and 34.

Figure 3:
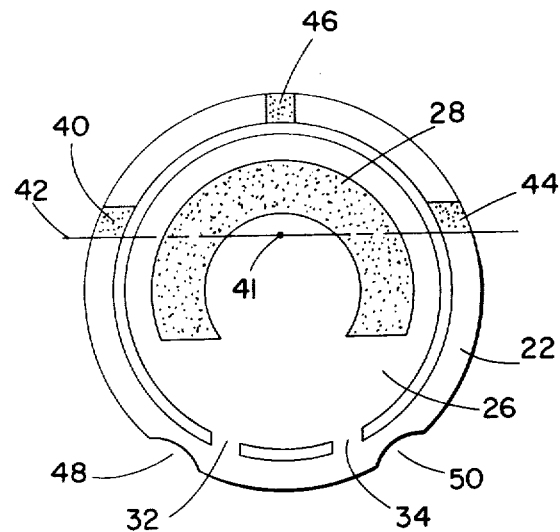
FIG. 3 is a top view of a portion of a proof mass assembly representing an additional embodiment of the invention.

Illustrated in FIG. 3 is an embodiment of the invention with additional flexing sections 48 and 50 provided by arcuate recesses in the annular support member 22 preferably located at a maximum distance from the mounting pads 40 and 44. The additional flexures 48 and 50 permit a portion of the support ring 22 to flex in a radial direction. Even when a continuous mounting surface from the pad 40 to pad 44 is used, this arrangement would be desirable. The combination of the flexing sections 48 and 50 together with a maximum separation of the flexures 32 and 34 from the axis of rotation 42 of the support ring 22 results in a decreased sensitivity to radial strain in the support ring 22 in terms of stress or strain produced in the flexure type pivot 32 and 34.

Figure 4:
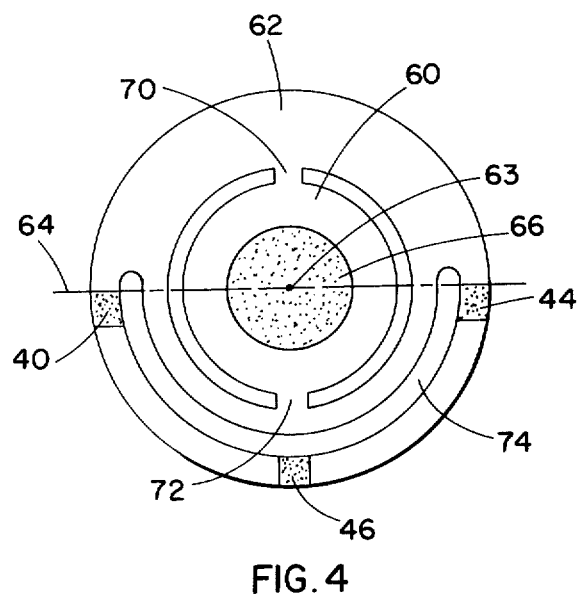
FIG. 4 is a top view of a portion of a proof mass assembly representing another embodiment of the invention.

Illustrated in FIG. 4 is an embodiment of the invention in a form wherein a movable member 60 is designed for linear motion as compared to the rotational pendulous motion of the flapper 26 as shown in FIGS. 2 and 3. In this embodiment a pair of translational flexures 70 and 72 connected between the support member 62 and the movable member 60 permit the movable member 60 to move in a linear direction perpendicular to the plane of the support member 62 along the sensitive axis 35, as shown in FIG. 1, of the instrument. The same principles of the invention apply to this embodiment in that strain in a support member 62 results in reduced motion of the centroid 63 of a position sensing or pick-off element 66 by aligning the support pads or elements 40 and 44 along an axis 64 that includes the centroid 63 of the pick-off element 66. This concept is not limited to circular pick-off configurations, nor to capacitive type pick-offs and could also be combined with the radial strain relief configuration shown in FIG. 3. Additionally, the two translational flexures 70 and 72 could lie in positions other than shown relative to the support ring 62. Also, the support member 62 is configured with an arcuate slot 74 which can enhance the effects of the placement of the spacer elements 40 and 44 for this particular embodiment.

Figure 5:
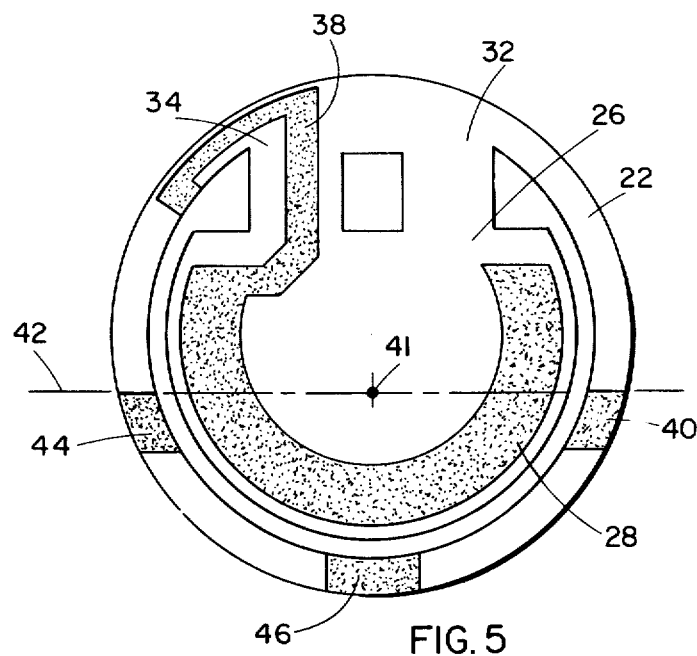
FIG. 5 is a top view of a portion of a proof mass assembly representing the preferred embodiment of the invention.

An example of the preferred embodiment of the invention is provided by the proof mass shown in FIG. 5. The elements of FIG. 5 identified by reference numerals 22, 26, 28, 32, 34, 38, 40, 41, 42, 44 and 46 substantially correspond to the elements with the same reference numerals in FIGS. 1 and 2. One difference between the illustrations of the proof masses of FIGS. 1 and 5 concerns the fact that the electrical pick-off lead 36 used to provide an electrical connection to the force coil 30 as shown in FIG. 1, is not shown in FIG. 5. Along with the electrical lead 38, the proof mass of FIG. 5 includes a similar electrical lead deposited on the other side of the proof mass, which is not visible in the top view of the proof mass provided in FIG. 5 that connects a capacitive pick-off area, on the other side of the proof mass corresponding to the pick-off area 28, across flexure 32 to a terminal on the support member 22.

By locating the edges of the spacer elements 40 and 44 such that the axis of rotation 42 of the support member 22 passes the centroid of the combined area of the pick-off plates including plate 28 and electrical leads including lead 38 connecting the pick-off plates to the support member, sensitivity to angular motion can be further reduced. Since the electrical leads connected to the pick-off plates in a transducer utilizing a capacitive pick-off system have a measurable effect on the pick-off signal, including the electrical lead area in calculating the centroid 41, can significantly reduce the types of errors resulting from stress induced angular rotation of the proof mass assembly.

Figure 6:
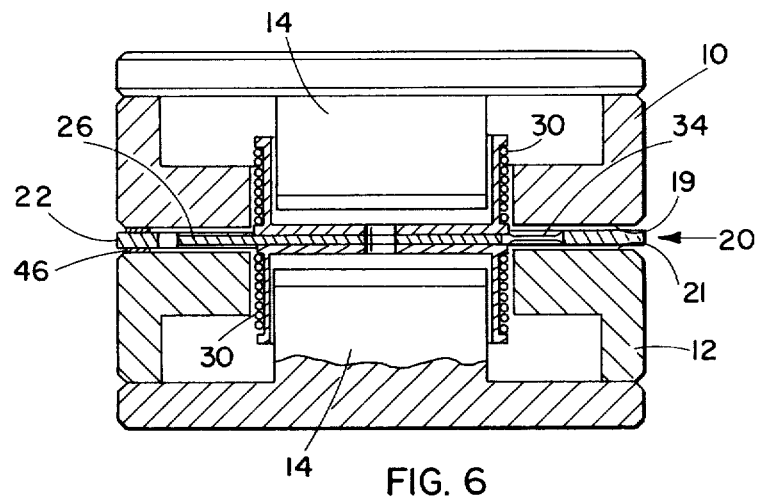
FIG. 6 is a cross-sectional view of an accelerometer employing the invention.

In a force transducer such as the accelerometer shown in FIG. 6 using capacitive pick-off, errors due to undesired angular rotation can be further reduced by taking into consideration, when calculating the centroid of the pick-off and electrical lead area, the relative distance of the nominal location of the pick-off area and electrical leads from the stator. Since capacitance varies inversely with distance between capacitor plates, the relative capacitance measured by those portions of the pick-off and electrical lead areas will decrease as the nominal distance from the stator, which serves as the other capacitor plate in transducers of this type, increases. Thus, in computing the centroid of the pick-off and electrical lead areas, the area of the pick-off and electrical lead area is reduced as a direct function of the predetermined nominal distance or spacing of each area from those portions of the stator that serve as capacitor plates.

This concept is illustrated in FIG. 6 representing a cross-section of the type of accelerometer shown in FIG. 1 wherein the reference numerals 10, 12, 14, 19, 20, 21, 22, 26, 30, 34 and 46 correspond to the reference numerals in FIGS. 1 and 5. For example, the flexure 34 as shown in FIG. 6 is significantly reduced in thickness as compared to the rest of the proof mass 20 thereby resulting in an increase in the predetermined nominal distance of the flexure 34 midway from each of the planar surfaces 19 and 21 of the stators 10 and 12 relative to the nominal distance of the pick-off area 28 of the movable member 26. Thus the area of the electrical lead 38 across the flexure 34, as shown in FIG. 5, should be reduced proportionately with the increased nominal to the planar faces 19 and 21 of the stators in calculating the centroid 41.

Figure 7:
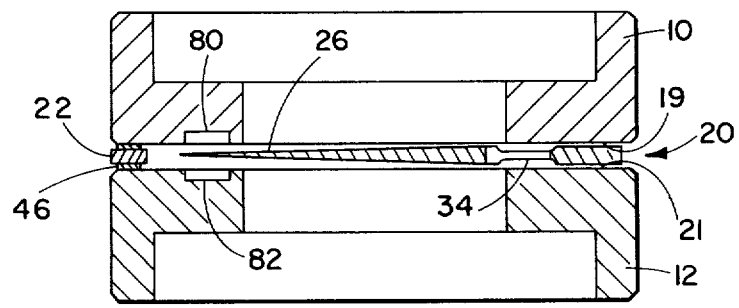
FIG. 7 is a simplified cross-sectional view of an accelerometer of the type shown in FIG. 6 employing a tapered proof mass assembly.

Another example of this concept is illustrated in FIG. 7, which is a simplified representation of the type of accelerometer shown in FIG. 6. In FIG. 7, the movable member 26 having the pick-off plate 28 deposited thereon is tapered with the relative nominal distance of the pick-off plate 28 from the planar faces 19 and 21 of the stators 10 and 12 increasing in a direction away from the flexure 34. In computing the centroid 41 of the areas of the pick-off and electrical lead areas, each element of the area should be reduced as a function of the increasing nominal distance from the stator faces 19 and 21. Thus, in the embodiment of FIG. 7, the area of the pick-off plate at the end of the movable member 26 away from the flexure 34 will be given relatively less weight in computing the centroid 41 as will the area of the electrical lead 38 across the flexure 34. Similarly, any variations in the portions of the stator forces 19 and 21 that serve as capacitor pick-off plates should be taken into account in computing the centroid 41. For example, the stator forces 19 and 21 of FIG. 7 include stepped portions 80 and 82 which increase the nominal distance to the movable member 26.

I claim:

1. An assembly for use within a transducer having a stator comprising:
   a support member;
   a movable member including at least one non circular pick-off area;
   means for connecting said movable member to said support member permitting said movable member at least a limited degree of movement; and
   at least one support element interposed between the stator and said support member wherein at least one edge of said support element is located in alignment with the centroid of said pick-off area thereby permitting that portion of said support member including said connecting means to rotate with respect to the stator with the axis of rotation passing through the centroid of the pick-off area.

2. The assembly of claim 1 including at least two support elements wherein one edge of each of said spacer elements is substantially aligned with each other and with the centroid of said pick-off area.

3. The assembly of claim 1 wherein said support member is of a generally circular configuration and includes two flexure portions one of said flexure portions located on one side of said connecting means and the other of said flexure portions located on the other side of said connecting means.

4. The assembly of claim 1 wherein said movable member is a generally circular planar element; said support member is a generally circular member concentric with said movable member; and said connecting means includes at least one flexure element.

5. The assembly of claim 4 wherein said flexure elements are attached to said rotating portion of said movable member at a maximum distance from said axis of rotation.

6. The assembly of claim 1 wherein said connecting means is attached to said rotational portion of said support member.

7. An assembly for use within a transducer having first and second stator members comprising:
   a movable member including at least one non circular pick-off area;
   a support member, including means for pendulously supporting said movable member, interposed between and supported by the first and second stator members; and
   at least one spacer member interposed between at least one of the stator members and said support member wherein said spacer member is located so as to provide for cantilevered support of one portion of said support member wherein the axis of cantilever rotation passes through the centroid of the pick-off area.

8. The assembly of claim 7 wherein said pendulous support means is located on said support member at a maximum distance from said axis of rotation.

9. The assembly of claim 7 wherein one of said spacer members is interposed between each of the stator members and said support member and wherein said spacer members are substantially aligned with the centroid of said pick-off areas.

10. The assembly of claim 9 wherein one edge of each of said spacer members is substantially aligned with the centroid of said pick-off elements.

11. The assembly of claim 7, 8, 9, or 10 wherein said support member is of generally circular configuration and includes two flexure portions to permit radial flexing of said support member.

12. An assembly for use within a force sensitive transducer having first and second stator members configured with opposed surfaces comprising:
a movable member of generally circular configuration including at least one non circular pick-off area;
an annular support member concentric with and connected to said movable member by means of at least one flexure wherein said annular support member is interposed and supported by said opposed surfaces of said first and second stator members; and
a plurality of spacer elements interposed between said support member and said opposed surfaces of said stator members wherein said spacer elements are located in alignment with the centroid of said pick-off area effective to provide a cantilevered support for said annular support member wherein the axis of cantilever rotation passes through the centroid of the pick-off area.

13. The assembly of claim 12 wherein said flexures are connected to the cantilevered portion of said support member a maximum distance from said axis of rotation.

14. The assembly of claim 13 wherein one edge of each of said spacer elements is substantially aligned with the centroid of said pick-off elements.

15. The assembly of claim 14 additionally including two other spacer elements interposed between said support member and said opposed surfaces of said stator members wherein said additional spacer elements are located on said support member remote from said flexure connection.

16. The assembly of claim 12, 13, 14, or 15 wherein said annular support member includes two flexure portions, one located on each side of said flexures on the same side of the axis of rotation as said flexures.

17. A proof mass assembly for use within an accelerometer having a stator structure including first and second stator members configured with opposed surfaces aligned perpendicularly to a sensitive axis of the accelerometer comprising:
an annular support member interposed between said opposed surfaces of the stator;
a flapper concentric with and flexurally suspended from inside said annular support member for movement in response to acceleration along the sensitive axis;
a non-circular pick-off capacitor plate deposed on said flapper; and
at least three pairs of spacer elements interposed between said annular support member and each of the opposed surfaces of the stator structure wherein a first two of said pairs of spacer elements are aligned with the centroid of said capacitor plate and the remaining pair of said spacer elements is located on said annular support member opposite said flexure suspension.

18. The assembly of claim 17 wherein one edge of each of said first two pairs of said spacer elements is essentially aligned with the centroid of said pick-off capacitor plate.

19. The assembly of claim 17 or 18 wherein said annular support member includes two flexure portions one on each side of said flexure suspension.

20. An assembly for use within a force sensitive transducer having a stator structure including first and second stator members configured with opposed surfaces comprising:
a movable member including at least one pick-off element;
a support member interposed and supported between the opposed surfaces of the first and second stator members;
at least two flexure members securing said movable member to said support member wherein said flexures are so located as to allow said movable member to move linearly with respect to the support member; and
at least one spacer element interposed between said support member and each of the opposed surfaces of the stator members wherein edges of said spacer elements are located in alignment with the centroid of said pick-off elements so as to permit cantilevered rotation of a portion of said support member with the axis of rotation through the centroid of the pick-off elements.

21. The assembly of claim 20 wherein one of said flexures is located on one side of said axis of rotation and a second of said flexures is located on the other side of said axis.

22. The assembly of claim 21 wherein said support member is configured with a slot substantially on the same side of said axis of rotation as said spacer elements.

23. An assembly for use within a transducer having a stator comprising:
a support member;
a movable member including at least one substantially non ring-shaped pick-off area;
means for connecting said movable member to said support member permitting said movable member at least a limited degree of movement; and
at least one support element interposed between the stator and said support member wherein at least one edge of said support element is located in substantial alignment with the centroid of said pick-off area thereby permitting that portion of said support member including said connecting means to rotate with respect to the stator with the axis of rotation substantially passing through the centroid of the pick-off area.

24. The assembly of claim 23 including at least two support elements wherein one edge of each of said spacer elements is substantially aligned with each other and with the centroid of said pick-off area.

25. The assembly of claim 23 wherein said support member is of a generally circular configuration and includes two flexure portions one of said flexure portion located on one side of said connecting means and the other of said flexure portions located on the other side of said connection means.

26. The assembly of claim 23 wherein said movable member is a generally circular planar element; said support member is a generally circular member concentric with said movable member; and said connecting means includes at least one flexure element.

27. The assembly of claim 26 wherein said flexure elements are attached to said rotating portion of said movable member at a maximum distance from said axis of rotation.

28. The assembly of claim 23 wherein said connecting means is attached to said rotational portion of said support member.

29. The assembly of claims 23, 24, 25, 26, 27 or 28 wherein said pick-off area is configured such that more than one-half of the pick-off area is located on one side of said axis of rotation.

30. The assembly of claim 23, 24, 25, 26, 27 or 28 wherein said pick-off area is generally arcuate in configuration.

31. An assembly for use within a force sensitive transducer having first and second stator members configurated with opposed surfaces comprising:
   a movable member of generally circular configuration including at least one pick-off area wherein said pick-off area is not of a substantially ring-shaped configuration concentric with said movable member;
   an annular support member concentric with and connected to said movable member by means of at least one flexure wherein said annular support member is interposed and supported by said opposed surfaces of said first and second stator members; and
   a plurality of spacer elements interposed between said support member and said opposed surfaces of said stator members wherein said spacer elements are located in substantial alignment with the centroid of said pick-off area effective to provide a centilevered support for said annular support member wherein the axis of cantilever rotation passes through the centroid of the pick-off area.

32. The assembly of claim 31 wherein said flexures are connected to the cantilevered portion of said support member a maximum distance from said axis of rotation.

33. The assembly of claim 32 wherein one edge of each of said spacer elements is substantially aligned with the centroid of said pick-off elements.

34. The assembly of claim 33 additionally including two other spacer elements interposed between said support member and said opposed surfaces of said stator members wherein said additional spacer elements are located on said support member remote from said flexure connection.

35. The assembly of claim 31, 32, 33 or 34 wherein said annular support member includes two flexure portions, one located on each side of said flexures on the same side of the axis of rotation as said flexures.

36. The assembly of claim 31, 32, 33 or 34 wherein said pick-off area is configured such that more than one-half of the pick-off area is located on one side of said axis of rotation.

37. The assembly of claim 31, 32, 33 or 34 wherein said pick-off area is generally arcuate in configuration.

38. A proof mass assembly for use within an accelerometer having a stator structure including first and second stator members configured with opposed surfaces aligned perpendicularly to a sensitive axis of the accelerometer comprising:
   an annular support member interposed between said opposed surfaces of the stator;
   a flapper concentric with and flexurally suspended from inside said annular support member for movement in response to acceleration along the sensitive axis;
   a pick-off capacitor plate deposed on said flapper wherein said pick-off capacitor plate forms a capacitor with one of the opposed stator surfaces; and
   at least three pairs of spacer elements interposed between said annular support member and each of the opposed surfaces of the stator structure wherein a first two of said pairs of spacer elements are essentially aligned with the centroid of said capacitor plate and the remaining pair of said spacer elements is located on said annular support member opposite said flexure suspension wherein said pick-off capacitor plate is configured such that more than one-half of the pick-off plate is located on one side of the axis defined by said first two pairs of spacer elements and the centroid of the capacitor plate.

39. The assembly of claim 38 wherein one edge of each of said first two pairs of said spacer elements is essentially aligned with the centroid of said pick-off capacitor plate.

40. The assembly of claim 38 or 39 wherein said annular support member includes two flexure portions one on each side of said flexure suspension.

41. An assembly for use within a transducer having a stator comprising:
   a support member;
   a movable member including at least one pick-off area;
   means for connecting said movable member to said support member permitting said movable member at least a limited degree of movement; and
   at least one support element interposed between the stator and said support member wherein at least one edge of said support element is located in substantial alignment with the centroid of said pick-off area thereby permitting that portion of said support member including said connecting means to rotate with respect to the stator with the axis of rotation substantially passing through the centroid of the pick-off area and wherein said pick-off area is configured such that more than one-half of the pick-off area is located on one side of said axis of rotation.

42. An assembly for use within a transducer having a stator comprising:
   a support member;
   a movable member including at least one pick-off area;
   means for connecting said movable member to said support member permitting said movable member at least a limited degree of movement;
   at least one electrical lead deposed to said support member, said movable member and said connecting means effective to electrically connect said pick-off area to said support member; and
   at least one support element interposed between the stator and said support member wherein at least one edge of said support element is located in substantial alignment with the centroid of said pick-off area and the area of said electrical lead thereby permitting that portion of said support member including said connecting means to rotate with respect to the stator with the axis of rotation substantially passing through the centroid of the combined area of the pick-off and lead.

43. The assembly of claim 42 including at least two support elements wherein one edge of each of said spacer elements is substantially aligned with each other and with the centroid of said pick-off area.

44. The assembly of claim 42 wherein said support member is of a generally circular configuration and includes two flexure portions one of said flexure portions located on one side of said connecting means and the other of said flexure portions located on the other side of said connecting means.

45. The assembly of claim 42 wherein said movable member is a generally circular planar element; said support member is a generally circular member concentric with said movable member; and said connecting means includes at least one flexure element.

46. The assembly of claim 45 wherein said flexure elements are attached to said rotating portion of said movable member at a maximum distance from said axis of rotation.

47. The assembly of claim 42 wherein said connecting means is attached to said rotational portion of said support member.

48. An assembly for use within a transducer having first and second stator members comprising:
- a movable member including at least one pick-off area;
- a support member, including means for pendulously supporting said movable member, interposed between and supported by the first and second stator members;
- at least one electrical lead deposed upon said movable member, said support member and said support means effective to electrically connect said pick-off area to said support member; and
- at least one spacer member interposed between at least one of the stator members and said support member such that said movable member and said supporting means are located a predetermined nominal distance between the first and second stator members and wherein said spacer member is located so as to provide for cantilevered support of one portion of said support member wherein the axis of cantilever rotation passes through the centroid of the combined area of said pick-off area and the area of said electrical lead.

49. The assembly of claim 48 wherein said pendulous support means is located on said support member at a maximum distance from said axis of rotation.

50. The assembly of claim 48 wherein one of said spacer members is interposed between each of the stator members and said support member and wherein said spacer members are substantially aligned with the centroid of said pick-off areas.

51. The assembly of claim 50 wherein one edge of each of said spacer members is substantially aligned with the centroid of said pick-off elements.

52. The assembly of claim 48, 49, 50 or 51 wherein said support member is of generally circular configuration and includes two flexure portions to permit radial flexing of said support member.

53. The assembly of claims 48, 49, 50 or 51 wherein said pick-off area and said electrical lead area for purposes of calculating said centroid are decreased as a function of said predetermined nominal distance of said pick-off area and said electrical lead area from the stator.

54. An assembly for use within a force sensitive transducer having first and second stator members configured with opposed surfaces comprising:
- a movable member of generally circular configuration including at least one non circular pick-off area;
- an annular support member concentric with and connected to said movable member by means of at least one flexure wherein said annular support member is interposed and supported by said opposed surfaces of said first and second stator members;
- at least one electrical lead deposed upon said movable member, said support member and said flexure effective to electrically connect said pick-off area to said support member; and
- a plurality of spacer elements interposed between said support member and said opposed surfaces of said stator members wherein said spacer elements are located in substantial alignment with the centroid of said pick-off area effective to provide a cantilevered support for said annular support member wherein the axis of cantilever rotation substantially passes through the centroid of the combined area of the pick-off area and area of said electrical lead.

55. The assembly of claim 54 wherein said flexures are connected to the cantilevered portion of said support member a maximum distance from said axis of rotation.

56. The assembly of claim 55 wherein one edge of each of said spacer elements is substantially aligned with the centroid of said pick-off elements.

57. The assembly of claim 56 additionally including two other spacer elements interposed between said support member and said opposed surfaces of said stator members wherein said additional spacer elements are located on said support member remote from said flexure connection.

58. The assembly of claim 54, 55, 56, or 57 wherein said annular support member includes two flexure portions, one located on each side of said flexures on the same side of the axis of rotation as said flexures.

59. The assembly of claim 54, 55, 56 or 57 wherein said support member, said movable member and said flexures are located a predetermined nominal distance between the opposed surfaces of the first and second stator members and wherein said pick-off area and said electrical lead area are reduced as a function of increased distance from said predetermined nominal location to the opposed surfaces for the purposes of calculating said centroid.

60. The assembly of claim 54, 55, 56 or 57 wherein said support member, said movable member and said flexure are each located a different predetermined nominal distance between the opposed surfaces of the first and second stator members and wherein said electrical lead area on said flexures is reduced by an amount proportional to the difference between said predetermined nominal distance of said flexure and the predetermined nominal distance of said movable member for the purpose of calculating said centroid.

61. A proof mass assembly for use within an accelerometer having a stator structure including first and second stator members configured with opposed surfaces aligned perpendicularly to a sensitive axis of the accelerometer comprising:
- an annular support member interposed between said opposed surfaces of the stator;
- a flapper concentric with and flexurally suspended from inside said annular support member for movement in response to acceleration along the sensitive axis;

a non-circular pick-off capacitor plate deposed on said flapper wherein said capacitor plate forms a capacitor with one of the opposed surfaces;

at least one electrical lead deposed on said support member, said flapper and said flexure suspension effective to electrically connect said capacitor plate with said support member; and at least three pairs of spacer elements interposed between said annular support member and each of the opposed surfaces of the stator structure wherein at first two of said pairs of spacer elements are substantially aligned with the centroid of the combined area of said capacitor plate and said electrical lead and the remaining pair of said spacer elements is located on said annular support member opposite said flexure suspension.

62. The assembly of claim 61 wherein one edge of each of said first two pairs of said spacer elements is substantially aligned with the centroid.

63. The assembly of claim 61 or 62 wherein said support member and said flapper are located a predetermined nominal distance between the opposed surfaces of the first and second stator members and wherein said pick-off area and said electrical lead area are reduced as a function of increased nominal distance from the opposed stator surfaces for the purpose of calculating said centroid.

64. The assembly of claim 62 wherein said annular support member includes two flexure portions one on each side of said flexure suspension.

65. The assembly of claim 61, 62 or 64 wherein said support member, said flapper and said flexure portions are located a predetermined nominal distance between the opposed surfaces of the first and second stator members and wherein said electrical lead area on said flexure suspension is reduced by an amount proportional to the difference in the nominal distance from said flapper to the opposed stator surfaces and the nominal distance from said flexure suspensions to the opposed stator surfaces for the purpose of calculating said centroid.

66. An assembly for use within a force sensitive transducer having a stator structure including first and second stator members configured with opposed surfaces comprising:

a movable member including at least one pick-off element;

a support member interposed and supported between the opposed surfaces of the first and second stator members;

at least two flexure members securing said movable member to said support member wherein said flexures are so located as to allow said movable member to move linearly with respect to the support member;

at least one electrical lead deposed on said movable member, said support member and at least one of said flexure members effective to electrically connect said pick-off element to said support member; and at least one spacer element interposed between said support member and each of the opposed surfaces of the stator members wherein edges of said spacer elements are located in substantial alignment with the centroid of the combined area of said pick-off elements and the area of said electrical leads so as to permit cantilevered rotation of a portion of said support member with the axis of rotation substantially through the centroid of the combined area of the pick-off elements and electrical leads.

67. The assembly of claim 66 wherein one of said flexures is located on one side of said axis of rotation and a second of said flexures is located on the other side of said axis.

68. The assembly of claim 67 wherein said support member is configured with a slot substantially on the same side of said axis of rotation as said spacer elements.

69. The assembly of claim 66, 67 or 68 wherein said support member and said movable member are located a predetermined nominal distance between the opposed surfaces of the first and second stator members and wherein said pick-off area and said electrical lead area are reduced as a function of increased nominal distance from the opposed stator surfaces for the purpose of calculating said centroid.

70. An assembly for use within a transducer having first and second stator members configured with opposed surfaces comprising:

a movable member including at least one pick-off area;

a support member, including means for pendulously supporting said movable member, interposed between and supported by the first and second stator members such that each portion of said pick-off area is located a predetermined nominal distance between the opposed stator surfaces; and at least one spacer member interposed between at least one of the stator members and said support member wherein said spacer member is located so as to provide for cantilevered support of one portion of said support member wherein the axis of cantilever rotation passes through the centroid of the pick-off area and wherein the area of each portion of the pick-off area is reduced as a function of increased nominal distance to the opposed surfaces for the purpose of calculating said centroid.

71. The assembly of claim 70 wherein said pendulous support means is located on said support member at a maximum distance from said axis of rotation.

72. The assembly of claim 71 wherein said movable member is tapered from said pendulous support means.

* * * * *